(12) United States Patent
Rohner

(10) Patent No.: US 10,686,353 B2
(45) Date of Patent: Jun. 16, 2020

(54) ROTARY LIFTING DEVICE

(71) Applicant: NTI AG, Spreitenbach (CH)

(72) Inventor: Ronald Rohner, Widen (CH)

(73) Assignee: NTI AG, Spreitenbach (CH)

(*) Notice: Subject to any disclaimer, the term of this patent is extended or adjusted under 35 U.S.C. 154(b) by 343 days.

(21) Appl. No.: 15/709,438

(22) Filed: Sep. 19, 2017

(65) Prior Publication Data

US 2018/0091030 A1 Mar. 29, 2018

(30) Foreign Application Priority Data

Sep. 27, 2016 (EP) .................................... 16190722

(51) Int. Cl.
*H02K 16/04* (2006.01)
*H02K 21/14* (2006.01)
(Continued)

(52) U.S. Cl.
CPC .............. *H02K 16/04* (2013.01); *G01L 3/104* (2013.01); *G01L 3/108* (2013.01); *H02K 16/00* (2013.01);
(Continued)

(58) Field of Classification Search
CPC ........ H02K 16/04; H02K 16/00; H02K 21/14; H02K 41/031; H02K 11/24; H02K 7/10; H02K 2201/18; G01L 3/104; G01L 3/108
See application file for complete search history.

(56) References Cited

U.S. PATENT DOCUMENTS 2,843,090 A * 7/1958 Walker .................... E21B 4/00
418/210
4,432,245 A * 2/1984 Hattori .................... G01L 3/101
464/97

(Continued)

FOREIGN PATENT DOCUMENTS

DE   10 2008 038758 A1   2/2010
EP        1 378 986 A1   1/2004
(Continued)

OTHER PUBLICATIONS

Extended European Search Report, dated Mar. 31, 2017, for corresponding European application No. 16190722.5, 8 pages.
(Continued)

*Primary Examiner* — Emily P Pham
(74) *Attorney, Agent, or Firm* — Kilpatrick Townsend & Stockton LLP

(57) ABSTRACT

A rotary lifting device comprises a rotary lifting shaft having a longitudinal axis, a linear motor for moving the rotary lifting shaft in the direction of its longitudinal axis, and a rotary motor for rotating the rotary lifting shaft about its longitudinal axis. The rotary motor has a stator and a hollow rotor, through which the rotary lifting shaft extends. The hollow rotor is rotationally kinematically coupled to the rotary lifting shaft. The linear motor is arranged stationary relative to the rotary motor and has an armature having a motion axis along which the armature is supported so as to be linearly movable. The armature is kinematically coupled to the rotary lifting shaft with respect to the movement of the rotary lifting shaft in the direction of its longitudinal axis at a first longitudinal end of the rotary lifting shaft. The linear motor is arranged laterally beside the rotary motor, with the longitudinal axis of the rotary lifting shaft being arranged (Continued)

Figure 1:
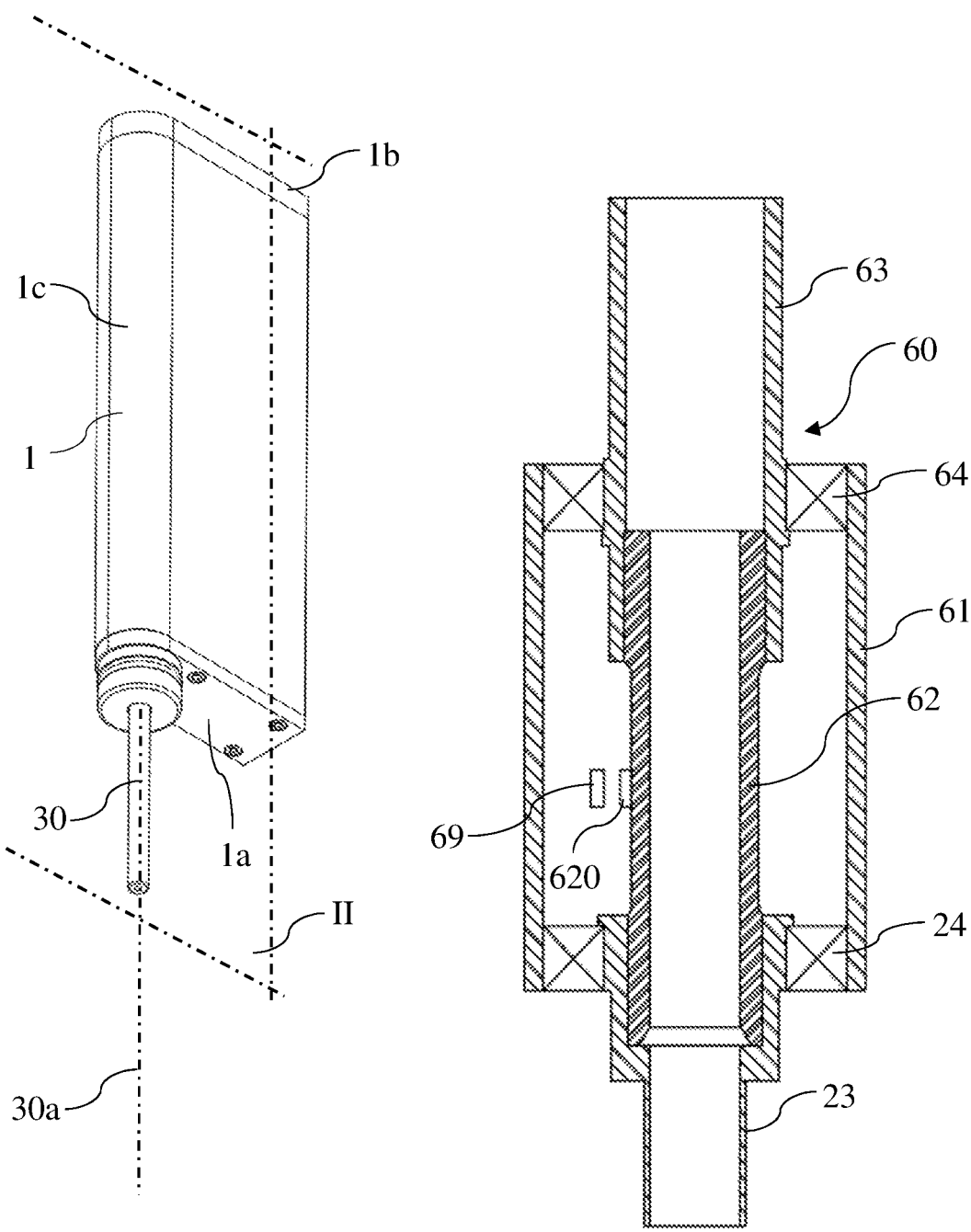

parallel to the axis of motion of the armature of the linear motor.

10 Claims, 6 Drawing Sheets

(51) Int. Cl.
*H02K 16/00* (2006.01)
*G01L 3/10* (2006.01)
*H02K 41/03* (2006.01)
*H02K 11/24* (2016.01)
*H02K 7/10* (2006.01)

(52) U.S. Cl.
CPC ........... *H02K 21/14* (2013.01); *H02K 41/031* (2013.01); *H02K 7/10* (2013.01); *H02K 11/24* (2016.01); *H02K 2201/18* (2013.01)

(56) References Cited

U.S. PATENT DOCUMENTS

| | | | | | |
|---|---|---|---|---|---|
| 2004/0004405 | A1* | 1/2004 | Ausderau | ............... | H02K 16/04 310/12.25 |
| 2005/0006971 | A1* | 1/2005 | Lindberg | ............. | H02K 1/2733 310/95 |
| 2009/0004028 | A1* | 1/2009 | Hihn | ..................... | B05B 7/1404 417/195 |
| 2012/0262259 | A1* | 10/2012 | Teo | ........................ | H02K 16/00 335/296 |
| 2014/0139050 | A1* | 5/2014 | Rohner | ................ | H02K 41/031 310/12.14 |
| 2016/0226349 | A1* | 8/2016 | Mastrocola | ............ | H02K 11/21 |

FOREIGN PATENT DOCUMENTS

| | | |
|---|---|---|
| EP | 2 733 830 A1 | 5/2014 |
| WO | 2011/046516 A1 | 4/2011 |

OTHER PUBLICATIONS

Hoffman, Karl, "Applying the Wheatstone Bridge Circuit," Hottinger Baldwin Messtechnik GmbH, Darmstadt, Germany, retrieved from the Internet at: https://www.hbm.com/fileadmin/mediapool/hbmdoc/technical/s1569.pdf on Sep. 15, 2017, 36 pages.

Krimmel, Wilfried, "Evolution and Future of Torque Measurement Technology," Physicom Corp., Scarborough, Ontario, Canada, retrieved from the Internet at: http://www.physicomcorp.com/doc_technote/Evolution_of_torque_ATI.pdf on Sep. 15, 2017, 9 pages.

Telemetrie-Messtechnik Schnorrengerg, "Application of a Torque Measuring Point," Bergisch Gladbach, Germany, retrieved from the internet at: http://www.telemetrie-world.de/666166/656066.html on Sep. 15, 2017, with machine translation, 10 pages.

\* cited by examiner

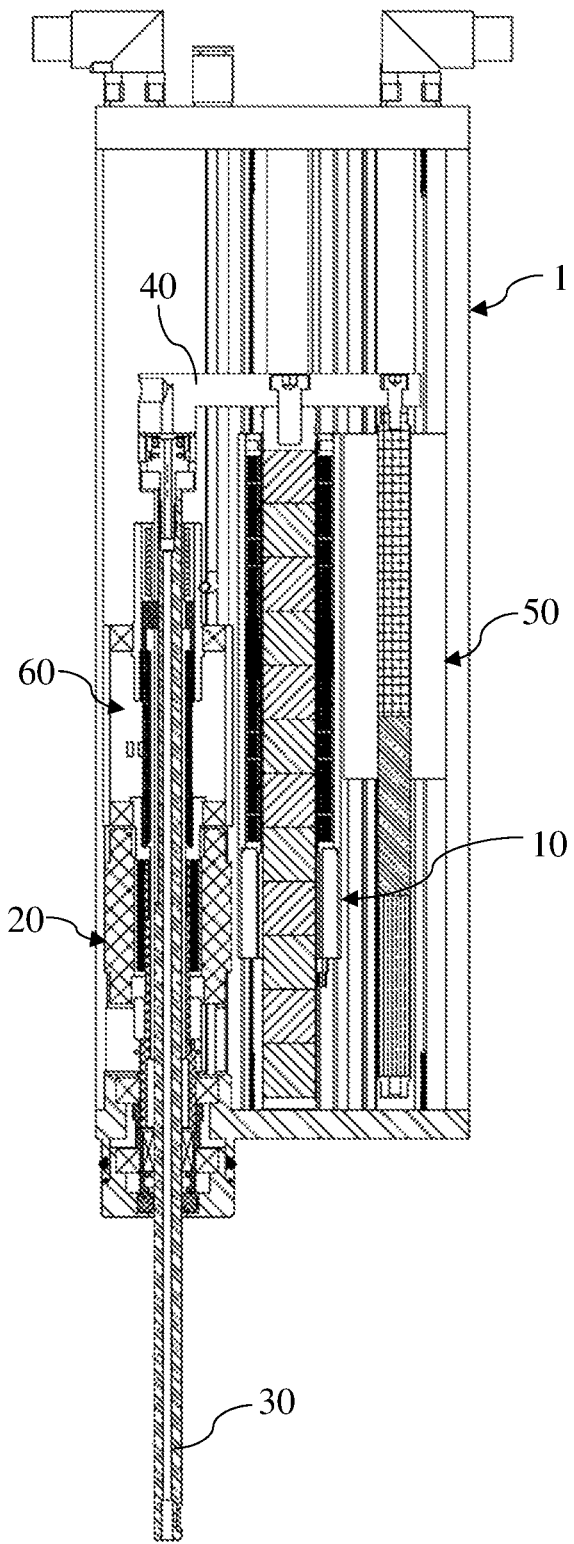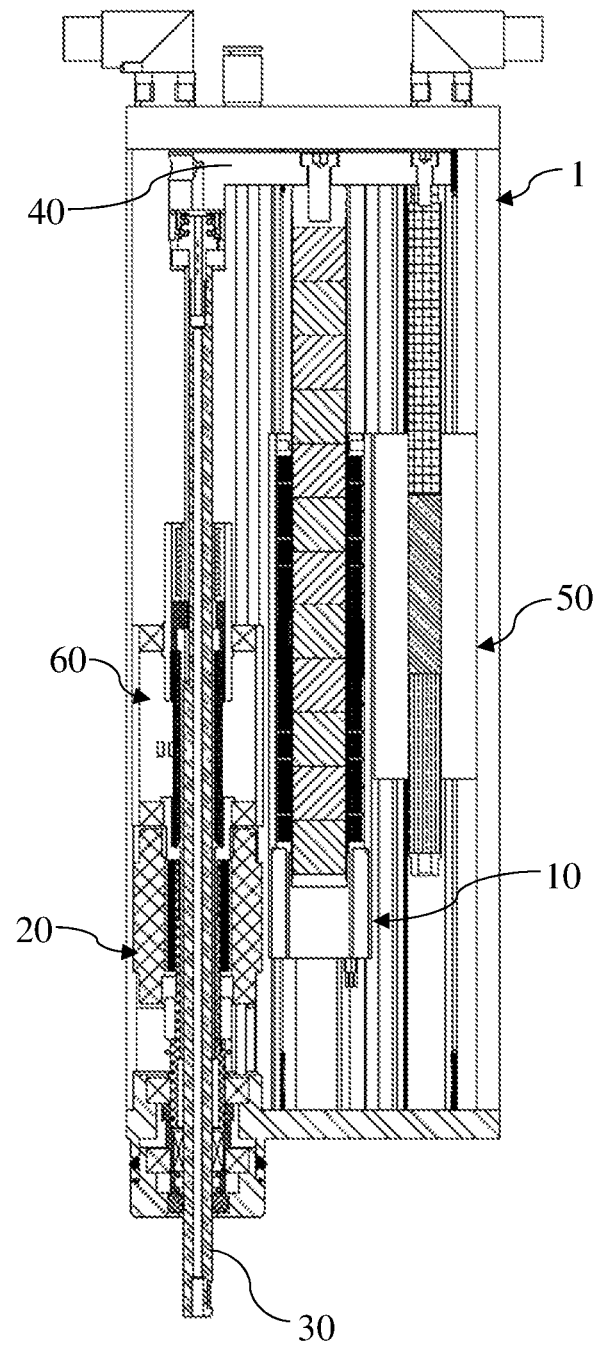
Fig. 3  Fig. 4

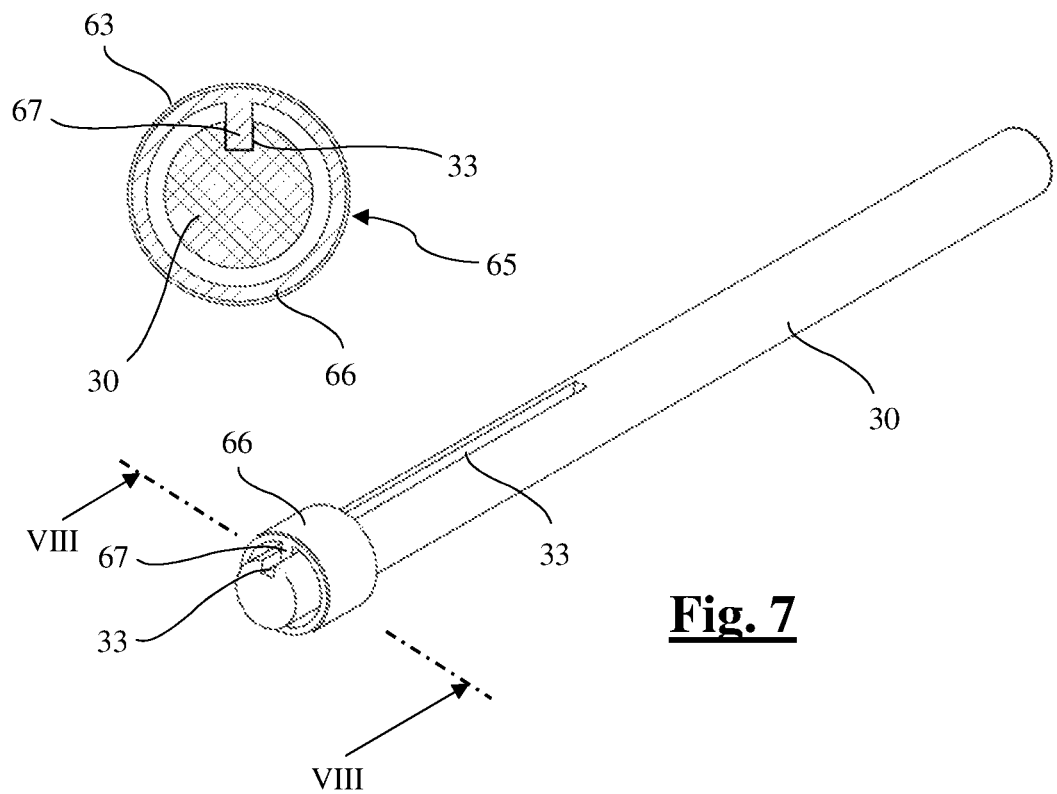
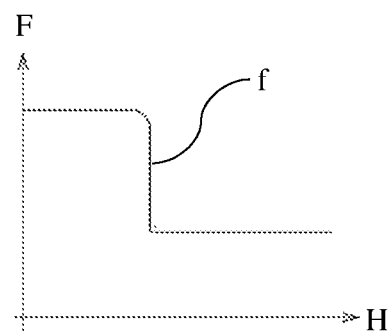

ROTARY LIFTING DEVICE

This application claims priority to European Patent Application No. 16190722.5, filed Sep. 27, 2016, the disclosure of which is incorporated by reference herein.

The present invention relates to a rotary lifting device according to the preamble of the independent claim.

Under the term rotary lifting devices drives are known in which a rotary movement (rotation) as well as a linear movement are applied to a pinion shaft. Accordingly, this pinion shaft is able to rotate and to linearly move at the same time and in the following is referred to as a rotary lifting shaft. Both movements of the rotary lifting shaft are completely independent of each other and are mostly performed by an electro motor. In the linear case this is a linear servo motor, also called linear motor, in the rotative case it refers to a rotary servomotor, also commonly called torque motor. Rotary lifting devices are used in closing and screwing tasks. In addition to dealing with the screwing in of screws or the cutting of threads they also deal with the screwing in of threaded parts. These tasks include in particular all processes for closing containers and bottles in which a threaded closure is to be put on. Another field of application comprises all handling tasks in which a product or a manufactured part has to be rotated for a specific angle, for the purpose of which it has to be gripped, lifted, rotated and subsequently put down again.

The process of screwing in a screw or a threaded cap consists of a linear movement in the longitudinal direction of the thread together with a rotational movement about the longitudinal axis at the same time. The relation between longitudinal movement and rotational movement is defined by the thread pitch. Depending on the application, different thread pitches are used so that in pure mechanical screwing devices in which both directions of movement are unchangeably coupled parts always need to be replaced when products having different thread pitches are processed. The big advantage of a rotary lifting device in which the rotational movement and the linear movement can be controlled independently is, that a product change or a change of the thread pitch can be performed by pushing a button, and that no mechanical adjustments need to be made.

Because the rotational and the linear movement can be adjusted completely independent from each other, very different strategies can be realized for the closing process: For precisely manufactured threads in metal pieces, the screwing in process is clearly defined by the thread pitch is clearly defined. This is different for injected cost optimized plastic threads, like they are used for disposable containers. Here, the tolerances may be so great that for example a strategy can be useful in which the linear movement is not derived position-dependent from the rotational movement, but is set in form of a linear feed force. In other words, the linear movement should flexibly follow the thread. Nevertheless, it may be useful, for example, to at the beginning of the screwing process push the cap onto the thread until the threads mate. All these combinations can be realized easily and directly with a rotary lifting device.

In detail, the actual process of screwing in, be it a screw or a cap, is defined or controlled by a large number of parameters. These include inter alia the rotational and the feed speed, if applicable a linear force in the longitudinal direction of the thread, the angular positioning of the rotational movement as well as the course of the torque of the rotational movement during the whole process, and especially at the end of the process in the form of the tightening torque.

How tight a screw or a cap of a container needs to be tightened depends on many parameters. Here there are different strategies as well. The tightening torque can be defined. But it can also be useful to define an angular position or to rotate until a specific linear position of the thread has been reached. Accordingly, arbitrary combinations or differentiations of such strategies can be achieved, if the relevant parameters can be controlled or measured.

Another aspect is checking whether a screwing in process was correctly performed. From the parameters angular position, torque, linear position and linear force or the relative course of those parameters during the screwing in process, reliable conclusions may be drawn on the course of the process. Thus, it can be determined whether a cap has been correctly put on and has been tightened correctly. Depending on the specification of the quality control, it may be sufficient to define individual parameters as a set value. In other cases it may be necessary to measure the effective course of the parameter.

In electromotive-performed closing processes the torque can be controlled relatively easily. The torque generated by an electromotor is proportional to the torque constant of the motor multiplied with the respective motor current. Depending on the type of the motor (DC motor, AC motor, single-phase motor, multi-phase motor, commutation method, etc.) the parameters may have to be determined from multiple sub-parameters. As long as the torque constant is a constant that is given for a specific type of motor or is known as a measured parameter of the respective motor, the torque can be set through the current, or can be calculated from the respective amperage. If for example the maximum tightening torque of a screw should be limited, this can be achieved through a current limit for the motor.

Another way to define a tightening torque consists of using mechanical or magnetic slip clutches. Such clutches release the connection between drive and output after exceeding the maximum torque. Accordingly, the tightening torque of a screw connection can be adjusted without the need to regulate or control the drive as such. Disadvantageous with this type of torque limitation is the laborious calibration of the coupling units. In addition, the torque limitation cannot be easily changed via software but requires a manual operation.

Another way to control the closing process with respect to the torque consists of performing an effective torque measurement. For that, a torque measurement is performed in the transmission path between the drive, normally an electric or pneumatic motor, and the output. There are various sufficiently known methods how a torque measurement can be performed. In addition to the measurement of the torsion of a measuring shaft (for example the rotary lifting shaft itself) using strain gauges, optical and magnetostrictive methods are used today in order to detect the torsion of the measuring shaft. The different methods can be characterized by different properties and by the attainable accuracy. Moreover, it can be differentiated between methods that need to have an electrical connection in form of a slip ring connection between a rotated and a stationary part and methods in which the transmission of the information can be performed contactless. It is known that slip ring transmissions are high-maintenance or prone to errors, and are not often used in long-term applications. This also holds for arrangements in which due to a linear movement of the torque measurement unit an extra cable connection in form of a because of a linear motion of a trailing cable is present. Here it is necessary as well to regularly change and replace the cables.

A rotary lifting device of the known type is described, for example, in EP 2 733 830 A1. This known rotary lifting device includes a permanent-magnetically excited tubular linear motor and a rotary motor coaxially assembled with the linear motor, as well as a rotary lifting shaft that can be driven by the linear motor and the rotary motor, the free end of which is for attaching the manipulating tools. The linear motor has a hollow tubular stator and an armature that is axially movable therein, in which the permanent magnets of the linear motor are arranged. The rotary motor essentially includes a stationary stator winding and a hollow (interior) rotor arranged internally of the stator winding. In case of a permanent-magnetically excited rotary motor the rotor consists of a hollow shaft with permanent magnets affixed to the hollow shaft. The rotary lifting shaft extends through the hollow shaft (rotor) and is supported in the rotor. In addition, in axial direction the rotary lifting shaft is kinematically coupled to the armature of the linear motor such that the linear movement of the armature is directly transmitted to the rotary lifting shaft. The coupling of the armature of the linear motor to the rotary lifting shaft is formed in a manner such that a rotational movement of the rotary lifting shaft is not transmitted to the armature of the linear motor. For that purpose, the rotor of the rotary motor is rotationally coupled to the rotary lifting shaft using a mechanical clutch, so that a rotational movement of the rotor of the rotary motor is transmitted to the rotary lifting shaft. The coupling of the rotor of the rotary motor to the rotary lifting shaft is formed in a manner such that the rotary lifting shaft can be moved in axial direction without the rotor being moved in axial direction along with it. Such a mechanical clutch, which transmits the rotation of the rotor to the rotary lifting shaft, may for example comprise a tappet in the form of a ring which is fixedly connected with the rotor with respect to rotation and which has a radially inwardly projecting protrusion, which engages into a groove provided on the rotary lifting shaft, which extends parallel to the longitudinal axis of the rotary lifting shaft, so the protrusion may slide in the groove. Thus, a torque may be transmitted from the rotor to the rotary lifting shaft, and at the same time the rotary lifting shaft can perform an axial (linear) movement along the length of the groove. For the transmission of higher torques, the ring tappet may have two or more such protrusions and the rotary lifting shaft may have two or more grooves, accordingly. The rotary motor is usually equipped with a built-in sensor unit for the detection of the rotational position of the rotor and thereby of the rotary lifting shaft. Alternatively, the linear motor may have a built-in sensor unit for the detection of the axial position of the armature and thereby of the rotary lifting shaft, as it is explained in detail in EP 2 860 496 A1, for example.

In applications, for example the screwing on of caps to bottles, two or more such rotary lifting devices are arranged beside each other or are arranged on a rotary plate, so that a compact space-saving arrangement is of big advantage.

In the rotary lifting device known from EP 2 733 830 A1, the rotary motor and the linear motor are arranged axially one after another. This results in a space-saving arrangement, however, the overall length of the rotary lifting device is relatively long. Especially in vertical installation positions and rooms having a low height, the overall length may lead to restrictions.

It is therefore an object of the present invention to suggest a rotary lifting device of the known type that can be used in such vertical installation positions, and in particular also in cases where only a low room height is available.

In accordance with the invention, this object is achieved through a rotary lifting device as it is specified by the features of the independent claim. Further advantageous aspects result from the features of the dependent claims.

The rotary lifting device according to the invention comprises a rotary lifting shaft with a longitudinal axis, a linear motor for moving the rotary lifting shaft in the direction of its longitudinal axis, and a rotary motor for rotating the rotary lifting shaft about its longitudinal axis. The rotary motor has a stator and a hollow rotor, through which the rotary lifting shaft extends and which is rotationally kinematically coupled to the rotary lifting shaft. The linear motor is arranged stationary relative to the rotary motor and has an armature with a motion axis along which the armature is supported so as to be linearly movable. The armature is kinematically coupled to the rotary lifting shaft with respect to the movement of the rotary lifting shaft in the direction of its longitudinal axis at a first longitudinal end of the rotary lifting shaft. The linear motor is arranged laterally beside the rotary motor, with the longitudinal axis of the rotary lifting shaft being arranged parallel to the axis of motion of the armature of the linear motor.

According to the invention, the linear motor and the rotary motor are arranged next (close) to each other, whereby the overall length of the rotary lifting device is substantially reduced while the device still continues to be relatively slim. For a technically useful design of the components of the rotary lifting device, the linear motor is the element determining the length. There, the overall length of the linear motor is comprised of the length of the stator with the coils and the desired linear stroke of its armature.

Advantageously, for the kinematical connection of the armature with the first longitudinal end of the rotary lifting shaft the rotary lifting device comprises a connection element which extends transverse to the longitudinal axis of the rotary lifting shaft and to the motion axis of the armature of the linear motor, and which is connected to the armature and to the rotary lifting shaft. Thereby, a particularly simple connection between the armature and the rotary lifting shaft can be realized.

Expediently, at the connection element a rotatable fixation is arranged for the rotational support of the first longitudinal end of the rotary lifting shaft. The first longitudinal end of the rotary lifting shaft is firmly connected to the connection element with respect to the movement of the rotary lifting shaft in the direction of its longitudinal axis. This represents a particularly simple kinematical coupling of the rotary lifting shaft to the connection element.

Advantageously, the rotary lifting shaft is entirely hollow, and the connection element comprises an internal port which is in communicating connection with the rotary lifting shaft for the supply of compressed air or vacuum into the rotary lifting shaft. Thereby, compressed air or vacuum can be guided through the rotary lifting shaft to the output longitudinal end.

Expediently, the rotary lifting device comprises a stationary external port for the supply of compressed air or vacuum. The external port and the internal port are connected through a flexible tube which is helically wound about the longitudinal axis of the rotary lifting shaft. Through the helically wound flexible tube, a constructively simple connection between the stationary external port and the movable internal port is achieved.

Advantageously, the rotary lifting device further comprises a constant force generator for the application of an at least sectionally constant force to the rotary lifting shaft in the direction of the longitudinal axis of the rotary lifting shaft. Thereby, in a vertical arrangement of the rotary lifting device the gravitational force acting on the rotary lifting shaft can be compensated for.

Expediently, the constant force generator is a magnetic constant force generator having a stationary part made of a magnetically conductive material and a diametrically magnetized part which is movably arranged parallel to the longitudinal axis of the rotary lifting shaft relative to the stationary part. The movably arranged part is firmly coupled to the rotary lifting shaft with respect to the movement of the rotary lifting shaft in the direction of its longitudinal axis. A magnetic constant force generator can be constructively realized particularly simple and does not need any energy supply.

Advantageously, for the firmly coupling of the movably arranged part of the constant force generator to the rotary lifting shaft the movably arranged part of the constant force generator is kinematically connected to the connection element. This represents a particularly easy coupling of the constant force generator to the rotary lifting shaft.

Advantageously, the constant force generator is configured to apply at least two different constant forces to the rotary lifting shaft, depending on its longitudinal position. Thereby, the constant force generator can assume a role as an emergency retractor while on the other hand the load on the linear motor can be kept low during normal use.

Advantageously, the rotary motor, the linear motor and the constant force generator are arranged in a common housing. This results in an integrated and particularly simple construction of the rotary lifting device which is easy to clean.

Advantageously, the rotary lifting device further comprises a torque measurement assembly for determining the torque transmitted from the rotary motor to the rotary lifting shaft. This allows to accurately regulate the torque applied to a workpiece by the rotary lifting shaft, or to control or use it as an independent measurement value for the quality control.

Expediently, the torque measurement assembly is arranged axially fixed relative to the longitudinal axis of the rotary lifting shaft. Thereby, the use of movable electrical connections for the torque measurement assembly is not required.

Advantageously, the torque measurement assembly is arranged between the rotor of the rotary motor and the first longitudinal end of the rotary lifting shaft. Accordingly, the torque measurement assembly is located inside of the housing of the rotary lifting device and does not need any additional constructional volume.

Expediently, the torque measurement assembly has a hollow rotationally arranged measuring shaft which is arranged axially fixed and coaxial to the longitudinal axis of the rotary lifting shaft. The rotary lifting shaft extends coaxially through the measuring shaft. The measuring shaft at one end is rotationally kinematically coupled to the rotor of the rotary motor and at its other end is rotationally kinematically coupled to the rotary lifting shaft. The torque measurement assembly has a sensor assembly for determination of the torsion of the measuring shaft caused by the torque.

In accordance with another aspect of the rotary lifting device according to the invention, for the determination of the torque generated by the rotary lifting device the stator of the rotary motor is pivotally supported about an axial bearing. Also, the rotary lifting device includes a measurement element connected to both the stator of the rotary motor and the housing or the common housing, respectively, for the measurement of the generated torque. In accordance with this aspect, the rotary motor is performed as a so-called pendulum-type motor. Herein, the measurement of the applied torque is performed indirectly via the measurement of the reaction torque at the rotary motor.

Figure 2:
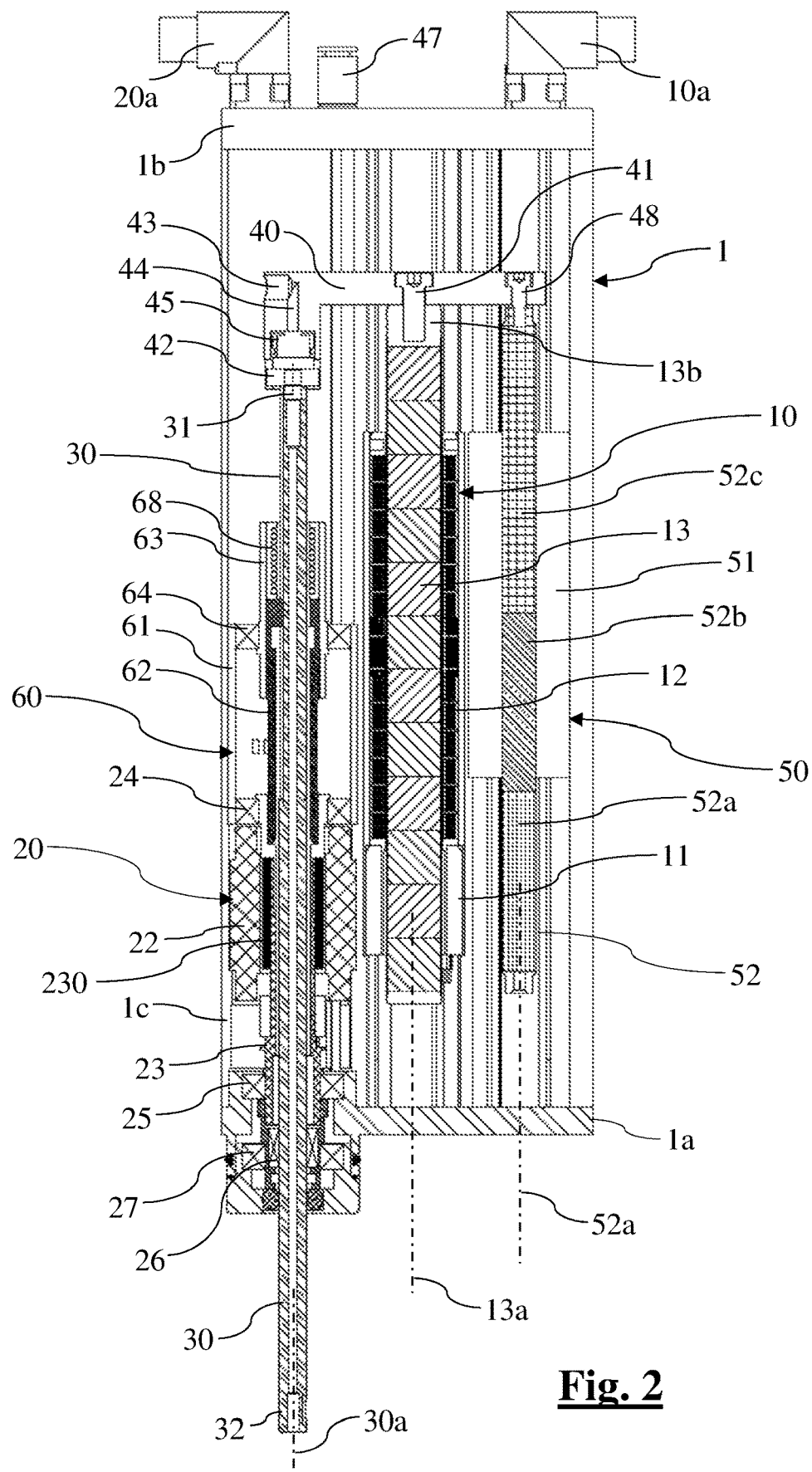
Figure 5:
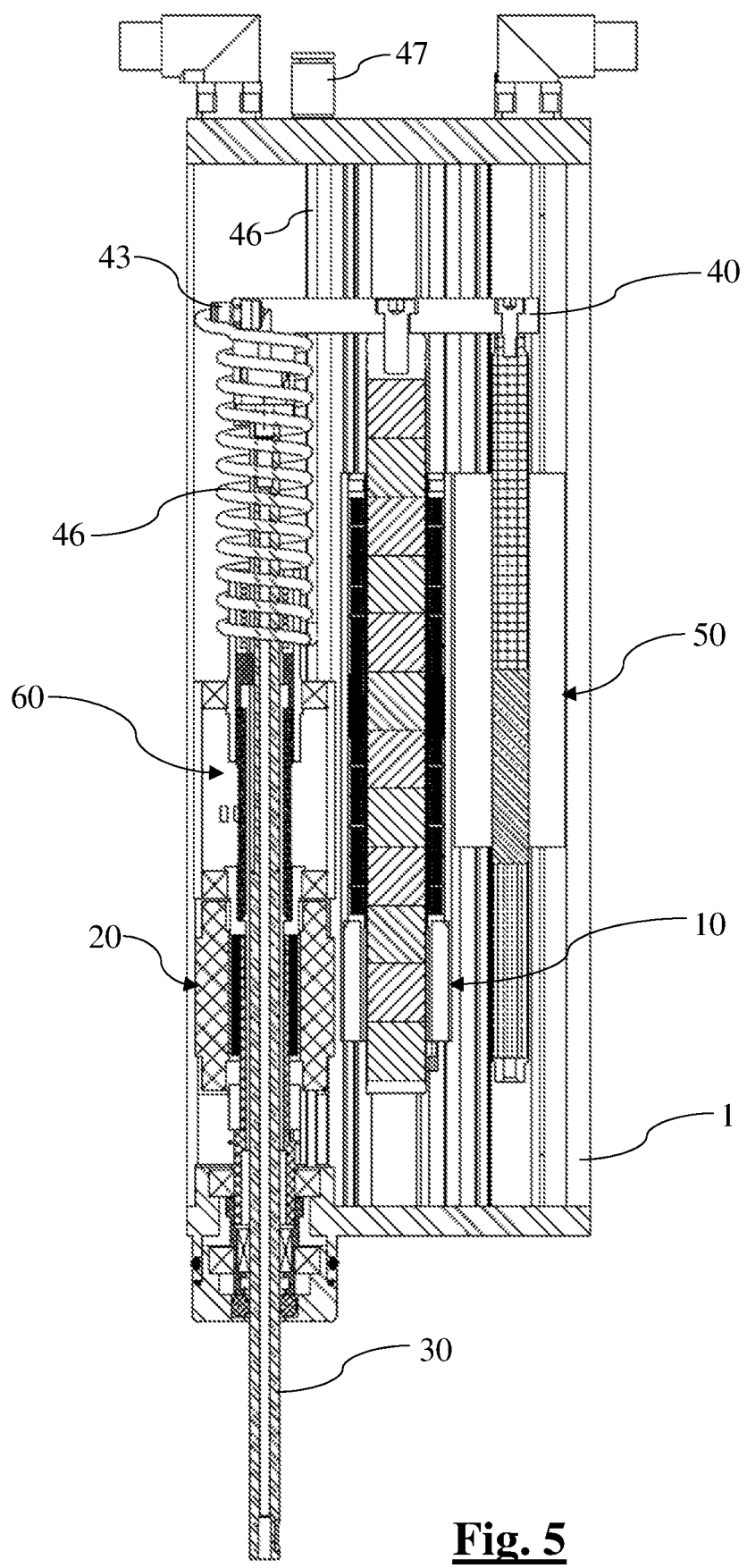
Figure 10:
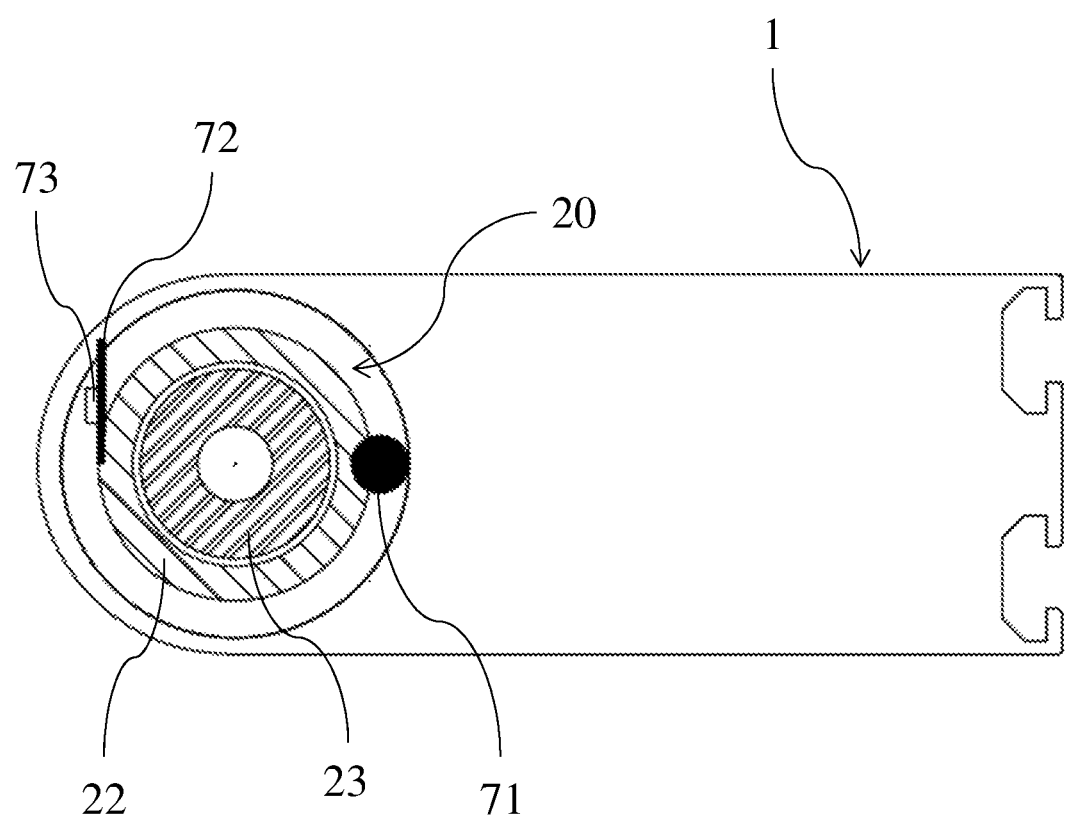

In the following, the invention is described in detail with the aid of an exemplary embodiment of the rotary lifting device shown in the drawings. These show:

FIG. 1 a perspective external view of an embodiment of the rotary lifting device according to the invention;

FIG. 2 a longitudinal section through the rotary lifting device according to the cutting plane II of FIG. 1;

FIG. 3-4 two longitudinal sections similar to FIG. 2, with two different longitudinal positions of the rotary lifting shaft;

FIG. 5 a longitudinal section similar to FIG. 2, with an additional detail, FIG. 6 a longitudinal section through a torque measurement assembly of the rotary lifting device;

FIG. 7-8 two detailed views for the explanation of a mechanical rotary coupling of the rotary lifting device according to the invention, FIG. 9 A force-distance-diagram of a constant force generator of the rotary lifting device according to the invention, and FIG. 10 an embodiment of the rotary lifting device according to the invention, in which the rotary motor is embodied as a pendulum-type motor.

For the description below, the following determination is valid: If a figure contains reference signs for the sake of clarity of the drawing which are is not mentioned in the corresponding part of the description, reference is made to the explanations given in the preceding or following parts of the description. On the other hand, for the prevention of overloading the drawings, less relevant reference signs are not shown in all figures. In this regard, it is referred to the rest of the figures.

The exemplary embodiment of a rotary lifting device according to the invention shown in FIG. 1-FIG. 5 includes a linear motor 10, a rotary motor 20, and a rotary lifting shaft 30, which are arranged in a common housing 1 having an anterior end wall 1a and a posterior end wall 1b and a mantle 1c connecting them, wherein the rotary lifting shaft 30 is guided through the anterior end wall and projects out of the housing 1. At the posterior end wall 1b, two electrical connections 10a and 20a are arranged for the energization of the linear motor 10 or the rotary motor 20, respectively. Another connection (not shown) serves for the measurement of the torque, if applicable, as long as these measurement signals are not forwarded through one of the connections 10a and 20a. The detailed construction of the linear motor 10 and the rotary motor 20 as well as their arrangement in the housing 1 become evident from the sectional views in FIGS. 2-5.

The linear motor 10 includes a stationary tubular motor housing attached in the housing 1, in which a tubular stator 12 with electrical coils is arranged. In the interior of the motor housing 11 inside of the stator 12 an armature 13 is coaxially arranged and slidingly supported along a motion axis 13a (FIG. 2). A longitudinal output end of the armature 13 is referred to as 13b. In the armature 13 permanent magnets are arranged, for example. The linear motor 10 includes a further sensor unit which is not shown (position detector) for the determination of the (for example absolute) axial position of the armature 13 relative to the stator 12. Insofar, the construction of the linear motor is conventional and does not require a more detailed description. A particularly suitable position sensor unit for the determination of the absolute position of the armature is described in detail in the EP 2 860 496 A1, for example.

The rotary motor 20 includes a stator 22 with an electrical coil and a tubular rotor 23, which is rotationally supported in two bearings and extends coaxially through the stator 22, which is arranged stationary in the housing 1. The rotary motor 20 is preferably (but not mandatory) a permanently excited motor, whereby the rotor 23 may be a hollow shaft with permanent magnets 230 pasted thereon. The rotary motor 20 further includes a sensor unit which is not shown (position detector) for the determination of the rotational position of the rotor 23 (and thereby of the rotary lifting shaft) relative to the stator 22. Insofar the construction of the rotary motor 20 is conventional and does not require a more detailed description.

A torque measurement assembly 60 which is arranged in a tubular measurement housing 61 connects coaxially to the rotary motor 20, and has a hollow measuring shaft coaxial with the rotor 23, which is connected to the rotor 23 in a rotationally fixed manner at one of its longitudinal ends, and is rotationally driven by the rotor. At its other longitudinal end, the measuring shaft 62 is connected in a rotationally fixed manner to a coaxial entraining tube 63. The entraining tube 63 is rotationally supported by a ball bearing 64 in the measurement housing and includes a linear bearing 68 (for example sliding bearings or linear ball bearings) for the rotary lifting shaft. In the entraining tube 63, there is further a mechanical rotational coupling 65 (FIG. 8) for the kinematical rotational coupling of the entraining tube 63 with the rotary lifting shaft 30 which extends coaxially through the rotor 23, the measuring shaft 62, and the entraining tube 63. This will be explained in more detail below.

The rotary lifting shaft 30 has a longitudinal axis 30*a* (FIG. 1 and FIG. 2) and extends coaxially through the rotor 23 of the rotary motor 20 as well as through the measuring shaft 62 and the entraining tube 63. The rotary lifting shaft 30 has a first longitudinal end 31 inside of the housing 1, and a second longitudinal end 32 outside of the housing 1. The rotary lifting shaft 30 is supported by two sliding bearings 26 and 68 (or corresponding linear ball bearings) so that it is moveable relative to the (axially fixed) rotor 23 in the direction of its longitudinal axis 30*a* (i.e. axially). The sliding bearing 26 itself is rotatably supported in a ball bearing 27, the sliding bearing 68 is rotatably supported in the ball bearing 64 via the rotatable entraining tube 63. Thereby, the rotary lifting shaft 30 is also rotatable about its longitudinal axis 30*a*.

The rotary lifting shaft 30 is kinematically coupled (only) with respect to rotation (around its longitudinal axis 30*a*) to the rotor 23 of the rotary motor 20 (via the measuring shaft 62 and the entraining tube 63) by means of the mechanical rotary coupling 65 which is shown in detailed representations in FIG. 7 and FIG. 8. The mechanical rotary coupling 65 includes an entraining ring 66 which is connected in a torque-proof manner to the entraining tube 63 and which has, on its inside, an inwardly projecting protrusion 6. The protrusion 67 of the entraining ring 66 engages into a longitudinal groove 33 of the rotary lifting shaft 30, which is arranged parallel to the longitudinal axis 30*a* of the rotary lifting shaft 30 and slides therein as the rotary lifting shaft 30 is axially moved (by means of the linear motor 10). By means of the entraining ring 66 and its protrusion 67 that engages into the longitudinal groove 33, the torque of the rotor 23 of the rotary motor 20 is transmitted (via the measuring shaft 62 and the entraining tube 63) to the rotary lifting shaft 30. Obviously, the entraining ring 66 may comprise two or more protrusions, and the rotary lifting shaft 30 correspondingly may comprise two or more longitudinal grooves.

As is clearly evident from FIG. 2-5, the linear motor 10 and the rotary motor 20 are (closely) arranged next to each other, with the longitudinal axis 30*a* of the rotary lifting shaft 30 and the motion axis 13*a* of the armature 13*a* of the linear motor 10 running parallel to each other. The longitudinal output end 13*b* of the armature 13 of the linear motor 10 projects out of the first longitudinal end 31 of the rotary lifting shaft 30 to some extent.

A (for example plate-like, or web-like) connection element 40 is mounted to the longitudinal output end 13*b* of the armature 12 of the linear motor 10 *a*, for example by means of a screw, which extends transverse to the longitudinal axis 30*a* of the rotary lifting shaft 30 and to the motion axis 13*a* of the armature 13. The connection element 40 has a rotary mount 42 for the first longitudinal end 31 of the rotary lifting shaft 30, the rotary mount 42 allowing for a rotational movement of the rotary lifting shaft 30 about its longitudinal axis 30*a* but keeping the rotary lifting shaft 30 stationary relative to the connection element 40 as regards the axial direction. By means of the connection element 40, the armature 13 of the linear motor 10 and the rotary lifting shaft 30 are kinematically coupled in axial direction as regards pushing and pulling, so that the rotary lifting shaft 30 can be moved in the direction of its longitudinal axis 30*a* by the linear motor 10. On the other hand, the rotary lifting shaft 30 can be rotated by the rotary motor 20 about its longitudinal axis 30*a*, so that a combined rotary lifting movement may be performed.

FIG. 3 and FIG. 4 show the rotary lifting device according to the invention in two different positions of the rotary lifting shaft 30. In FIG. 3 the rotary lifting shaft 30 is extended, in FIG. 4 the rotary lifting shaft 30 is retracted. Otherwise, the representations shown in FIGS. 3 and 4 do not differ from the representation shown in FIG. 2.

For many applications of the rotary lifting device it is necessary that compressed air and vacuum are provided at the longitudinal output end 32 of the rotary lifting shaft 30. For that reason, the rotary lifting shaft 30 is continually hollow (or tubular). At the connection element 40, an internal port 43 is arranged which is communicating connection with the (hollow) inner space of the rotary lifting shaft 30 using a conduit 44 and a rotary seal 45. A flexible conduit 46 is connected with one end thereof to the internal port 43 (FIG. 5), which leads to an external port 47 arranged on the housing 1 with the other end thereof. Thus, by means of the external port 47, the flexible conduit 46, the internal port 43, the conduit 44, and the inner space of the rotary lifting shaft 30, compressed air and vacuum may be guided to the longitudinal output end 32 of the rotary lifting shaft 30.

For the sake of clarity, the flexible conduit 46 is only shown in FIG. 5. With respect to the longitudinal axis 30*a* of the rotary lifting shaft 30 it is helically wound about the components between the connection element 40 and the torque measurement assembly 60, so that during linear movement of the rotary lifting shaft 30 its length may easily adapt to the respective longitudinal position of the connection element 40. Obviously, the supply of the compressed air or of the vacuum from the external port 47 to the internal port 43 can be achieved with the aid of a sliding seal as well.

The torque measurement assembly 60 is shown in FIG. 6 in a schematized manner at an enlarged scale. In addition to the already described components, it comprises a sensor unit, consisting of a part 620 that is attached to and rotates together with the measuring shaft 62 and a spatially fixed part 69, for determining the twist or torsion of the measuring shaft 62. The torsion of the measuring shaft is determined, for example, by using strain gauges which are pasted onto the measuring shaft 62 at angles of +−45° relative to the thrust plane, as this is described, for example, on page 8 of the article "Anwendung der Wheatstoneschen Bruckenschaltung" by Karl Hoffmann of the company Hottinger Baldwin Messtechnik GmbH, Darmstadt, Germany (http://www.hbm.com.p1/pdf/w1188.pdf), or in the article "Applikation einer Drehmomentmessstelle" of the company Telemetrie-Messtechnik Schnorrenberg, Bergisch-Gladbach, Germany (http://www.telemetrie-world.de/fachartikel/5.%20Applikation%20einer%20Drehmomentmessstelle.pdf). The measuring shaft 62 is driven by the rotor 23 of the rotary motor 20 at one end, and the other end thereof drives the rotary lifting shaft 30 via the entraining tube 63 and the mechanical rotary coupling 65. The torque transmitted to the rotary lifting shaft 30 by the rotary motor 20 causes a twist of the measuring shaft 62, which is recorded by the sensor unit and presents a measure for the torque. Suitable sensor units for the determination of the twist of the measuring shaft 62 are known and therefore do not require further explanations.

The measuring shaft 62 may be embodied as a cage-like structure with axially parallel rods (for example having a circular cross-sectional profile) connecting the rotor 23 of the rotary motor 20 and the entraining tube 63, however, instead of rods flat profiles having a rectangular cross-sectional profile may be used as well.

A great advantage of the afore-described torque measurement assembly is that it is arranged linearly stationary, so that upon using the nowadays common contactless transmission systems between the co-rotating part 62 of the sensor unit and the spatially fixed part 69 of the sensor unit no movable cables or slip rings are necessary, even though the rotary lifting shaft may perform a rotational movement as well as an (axial) linear movement (see also article "Entwicklung and Zukunft der Drehmomentmesstechnik", Dr. Wilfried Krimmel, Lorenz Messtechnik GmbH, https://www.transmetra.ch/image/publikationen/drehmoment-messtechnik.pdf).

Obviously, it is also possible to use the rotary lifting shaft 30 or a section thereof located between the rotor 23 of the rotary motor 20 and the rotary coupling 65 as measuring shaft. However, it is a prerequisite then that the sensor unit for the twist of the measuring shaft or a part of it must be moved along with it.

If a rotary lifting device is used vertically, as shown, that is to say with a vertical orientation of the longitudinal axis 30a of the rotary lifting shaft 30, as this is mostly the case for closing applications, the linear motor 10 always has to work against the gravitational force of the rotary lifting shaft 30 and all components connected thereto, or to the longitudinal output end 32 thereof, respectively. Therefore, the linear motor 10 is loaded to an extent that is higher than it would be necessary for the linear movement of the rotary lifting shaft 30. For the compensation of that gravitational force, a compensation element in form of a magnetic constant force generator 50 is arranged in the housing 1 directly next to the linear motor 10. The constant force generator 50 includes a fixed tubular section 51 made of magnetically conductive material, and a coaxially movable section 52 arranged therein. The motion axis of the moveable section 52 is referenced 52a, and is parallel to the motion axis 13a of the armature 13 of the linear motor 10. The movable section 52 is comprised of two magnetic sections 52a and 52b, with (differently strong) diametrical magnetization and of a third section 52b made of a magnetically non-conductive material. The third section 52c is connected to the connection element 40 using a screw 48, for example. The constant force generator 50 (in the practical use of the rotary lifting device) generates an upwardly directed force indirectly acting on the rotary lifting shaft 30 via the connection element 40, and thus compensates the gravitational force (entirely or partially). The construction and mode of operation of the constant force generator are described in detail in the EP 1 378 986 A1, for example, so that the skilled person does not need any further explanations in this regard.

The gravitational force compensation could also be performed using a mechanical spring. A pneumatic compensation device is also conceivable.

In applications with horizontal orientations of the rotary lifting shaft no gravitational force compensation is necessary, so in such cases the constant force generator 50, which is optional in any event, cannot effect any gravitational force compensation.

If both the sections 52a and 52b, of the movably arranged section 52 of the constant force generator are equally (diametrically) magnetized, the gravitational compensation force acting on the rotary lifting shaft 30 is constant over the entire linear movement stroke of the rotary lifting shaft 30. According to another aspect of the invention, the strength of the diametrical magnetization in the two sections 52a and 52b is different, which can be realized, for example, by the use of two differently strong magnets in the sections 52a and 52b. Due to the differently strong magnetization, the gravitational compensation force acting on the rotary lifting shaft 30 is distance-dependent, i.e. it is dependent on the axial position of the rotary lifting shaft 30, as this is schematically shown in the force-distance-diagram of FIG. 9. In the diagram, the abscissa shows the stroke H (the axial position) of the rotary lifting shaft 30, and the ordinate shows the gravitational compensation force F acting on the rotary lifting shaft. The graph of the gravitational compensation force is referenced F. As can be seen, the force F has a first constant value up to a specific stroke, and from there it has a second, lower constant value compared to the first value.

Rotary lifting devices are often used on carousel arrangements. If an error occurs for whatever reason, for example if the power supply fails, all rotary lifting shafts of the rotary lifting devices must be pulled upwards in order to prevent a collision in the turning carousel arrangement. This is because usually the carousel is so heavy that the stopping distance is too long to prevent a collision.

The constant force generator 50, in addition to the compensation of the gravitational force, may also take the function as an emergency retraction if the force acting on the rotary lifting shaft is sufficiently strong to accelerate the rotary lifting shaft and all elements attached thereto upwards in case of an emergency. However, the use of a constant force generator of that strength means that during normal use the linear motor 10 has to push the rotary lifting axis 30 down with a high force. This results in that the linear motor overheats very quickly. An advantageous solution to his problem is that the constant force generator 50 generates a position-dependent force as has been described above. For example, the constant force generator 50 generates a force of 60 N for an extension of the rotary lifting shaft 30 in the range of 70-100 mm, however, in the range of 0-70 mm only a force of 30 N. Accordingly, during normal use the linear motor 10 has to overcome the 60 N only in the range of 70-100 mm, otherwise only 30 N, less the gravitational force depending on the mass in each case.

Alternatives to the described embodiments are conceivable. For example, the rotary motor 20 may be embodied as a so called pendulum-type motor, in which a torque applied by the rotary lifting device may be measured indirectly. How this can be done, is schematically shown in FIG. 10 in which the rotary lifting shaft is not shown for reasons of the simplicity of the drawings, it is arranged in the interior of the rotor 23 of the rotary motor 20. Upon application of a torque, the torque applied by the rotary lifting device results in a reaction torque acting on the rotary motor 20. The stator 22 of the rotary motor is pivotally supported about an axial bearing 71. The reaction torque results in a pivoting of the stator 22 about the axial bearing 71. A measurement element is connected to the stator 22 of the rotary motor as well as to the common (stationary) housing 1 of the rotary lifting device, which comprises a connection element 72 (for example in form of a web) acting as a "cantilever" and a sensor unit 73. Due to the pivoting, the connection element (the cantilever) is either compressed or stretched (depending on the direction of the pivoting). The sensor unit 73 determines the compression or stretching (and thereby quasi the reaction torque caused by the torque applied by the rotary lifting device), and from that it is able to calculate the raised torque.

The invention has been explained with reference to an embodiment, however, it is not intended to be limited to the embodiment. Instead, numerous modifications are conceivable for the skilled person without departing from the teaching of the invention. The scope of protection is therefore defined by the appended patent claims.

The invention claimed is:

1. A rotary lifting device comprising:
   a rotary lifting shaft having a longitudinal axis,
   a linear motor for moving the rotary lifting shaft in a direction of the longitudinal axis of the rotary lifting shaft, and
   a rotary motor for rotating the rotary lifting shaft about the longitudinal axis of the rotary lifting shaft,
   wherein the rotary motor has a stator and a hollow rotor, through which the rotary lifting shaft extends and which is rotationally kinematically coupled to the rotary lifting shaft, and
   wherein the linear motor is arranged stationary relative to the rotary motor and has an armature having a motion axis along which the armature is supported so as to be linearly movable,
   wherein the armature is kinematically coupled to the rotary lifting shaft with respect to movement of the rotary lifting shaft in the direction of the longitudinal axis of the rotary lifting shaft at a first longitudinal end of the rotary lifting shaft,
   wherein the linear motor is arranged laterally beside the rotary motor, with the longitudinal axis of the rotary lifting shaft being arranged parallel to an axis of motion of the armature of the linear motor,
   wherein the rotary lifting device further comprise a torque measurement assembly for determining a torque transmitted from the rotary motor to the rotary lifting shaft,
   wherein the torque measurement assembly has a hollow rotationally arranged measuring shaft which is arranged axially fixed and coaxial to the longitudinal axis of the rotary lifting shaft,
   wherein the rotary lifting shaft extends coaxially through the hollow rotationally arranged measuring shaft,
   wherein the hollow rotationally arranged measuring shaft at a first end is rotationally kinematically coupled to the hollow rotor of the rotary motor and at a second end is rotationally kinematically coupled to the rotary lifting shaft, and
   wherein the torque measurement assembly has a sensor assembly for determination of a torsion of the hollow rotationally arranged measuring shaft caused by the torque.

2. The rotary lifting device according to claim 1, wherein for a kinematical connection of the armature with the first longitudinal end of the rotary lifting shaft, the rotary lifting shaft comprises a connection element which extends transverse to the longitudinal axis of the rotary lifting shaft and to the motion axis of the armature of the linear motor and which is connected to the armature and to the rotary lifting shaft.

3. The rotary lifting device according to claim 2, wherein at the connection element a rotatable fixation is arranged for a rotational support of the first longitudinal end of the rotary lifting shaft, and wherein the first longitudinal end of the rotary lifting shaft is firmly connected to the connection element with respect to the motion of the rotary lifting shaft in the direction of the longitudinal axis of the rotary lifting shaft.

4. The rotary lifting device according to claim 2, wherein the rotary lifting shaft is entirely hollow, and wherein the connection element comprises an internal port which is in communicating connection with the rotary lifting shaft for a supply of compressed air or vacuum into the rotary lifting shaft.

5. The rotary lifting device according to claim 4, further comprising a stationary external port for the supply of compressed air or vacuum, wherein the external port and the internal port are connected through a flexible tube which is helically wound about the longitudinal axis of the rotary lifting shaft.

6. The rotary lifting device according to claim 1, further comprising a constant force generator for an application of an at least sectionally constant force to the rotary lifting shaft in the direction of the longitudinal axis of the rotary lifting shaft.

7. The rotary lifting device according to claim 6, wherein the constant force generator is a magnetic constant force generator having a stationary part made of a magnetically conductive material and a diametrically magnetized part which is movably arranged parallel to the longitudinal axis of the rotary lifting shaft relative to the stationary part, wherein the movably arranged diametrically magnetized part is firmly coupled to the rotary lifting shaft with respect to the movement of the rotary lifting shaft in the direction of the longitudinal axis of the rotary lifting shaft.

8. The rotary lifting device according to claim 7, wherein for a kinematical connection of the armature with the first longitudinal end of the rotary lifting shaft, the rotary lifting shaft comprises a connection element which extends transverse to the longitudinal axis of the rotary lifting shaft and to the motion axis of the armature of the linear motor and which is connected to the armature and to the rotary lifting shaft, and
   wherein for the firmly coupling of the movably arranged diametrically magnetized part of the constant force generator to the rotary lifting shaft, the movably arranged diametrically magnetized part of the constant force generator is kinematically connected to the connection element.

9. The rotary lifting device according to claim 6, wherein the constant force generator is configured to apply at least two different constant forces to the rotary lifting shaft, depending on a longitudinal position of the rotary lifting shaft.

10. The rotary lifting device according to claim 6, wherein the rotary motor, the linear motor and the constant force generator are arranged in a common housing.

* * * * *